Sept. 7, 1937.  C. C. FARMER  2,092,413
PISTON RING JOINT
Filed June 22, 1934
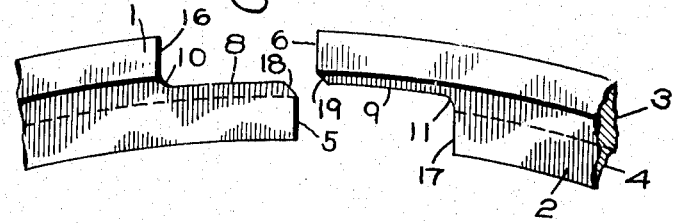
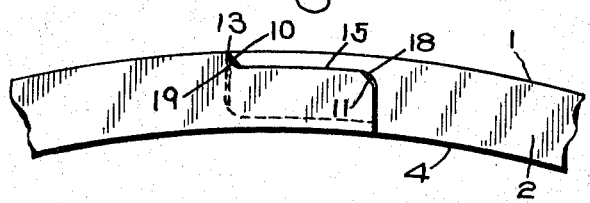
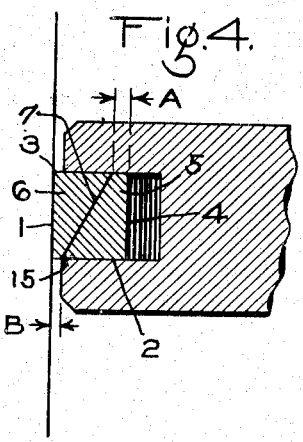
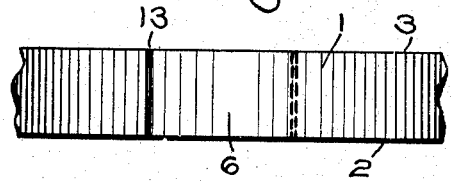
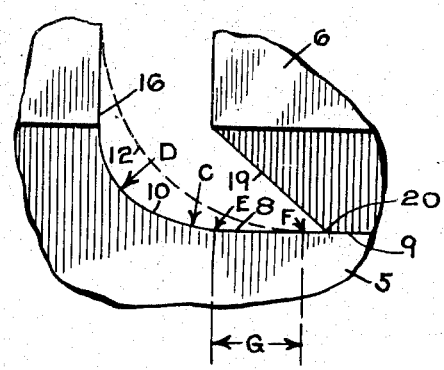
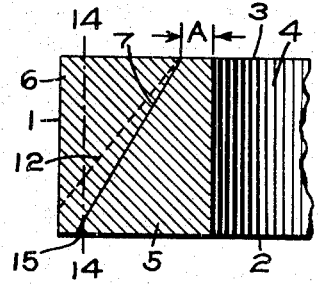
INVENTOR
CLYDE C. FARMER
BY
*Wm. M. Cady*
ATTORNEY Patented Sept. 7, 1937

2,092,413

UNITED STATES PATENT OFFICE 2,092,413

PISTON RING JOINT

Clyde C. Farmer, Pittsburgh, Pa., assignor to The Westinghouse Air Brake Company, Wilmerding, Pa., a corporation of Pennsylvania Application June 22, 1934, Serial No. 731,813

8 Claims. (Cl. 309—46)

This invention relates to piston rings and more particularly to split piston rings of the step cut type.

In Patent No. 1,984,889 issued to Oscar S. McCurdy, December 18, 1934, a piston ring of the above type is disclosed in which the joint is formed by cutting away the ring material obliquely at the ends of the ring in a transverse direction, thereby forming on both ends of the ring, a tongue having an oblique sealing surface, the sealing surface on one tongue being adapted to slidably engage that on the other tongue so as to provide a leak-proof joint when the ring is in the compressed or working condition, the obliquity of the cut through the ring to form said tongues being so arranged that the outermost tongue of the joint is triangular in cross section.

According to the construction disclosed in the above mentioned patent, the oblique sealing faces of the two tongues of the ring joint intersect one side of the ring at a line spaced from the inner circumference of the ring a distance equal to 0.2 of the depth of the ring and intersect the outer circumference or working face of the ring at a distance from the opposite side equal to 0.2 of the width of the working face of the ring, and the surfaces of the oblique sealing faces are cylindrical in the direction of the length of the ring, so that when the ring joint is closed there is no opening through the joint to permit leakage of fluid under pressure from one side to the other even after the ring has become worn and the ends consequently separated to take up such wear.

Rings having joints of the above character are highly efficient in preventing leakage in fluid pressure brake devices where even slight leakage is liable to cause such devices to fail to operate, and in view of this high efficiency, it is proposed to use rings having a similar joint in air compressor pistons.

In rings of the above type, the outside tongue of the joint is initially relatively weak as compared to the portion of the ring back of the joint, and due to the angularity of the coacting sealing surfaces of the two tongues of the joint, the cross sectional area, and therefore the strength, of the outside tongue reduces rapidly as the ring wears. This feature is objectionable in rings for air compressors, for in air compressor service, the rings are subject to hard usage and wear and it is undesirable that the outer tongue should become so weakened, due to wear, as to be liable to break off and then cause damage to the compressor.

One object of my invention is to provide an improved lap joint piston ring of the above character in which the strength of the outside tongue is greater than in rings constructed in accordance with the above mentioned patent, and therefore less liable to become broken in air compressor service.

I attain this object by changing the angle of the cooperating oblique sealing surfaces of the ring joint, so that, instead of said surfaces intersecting the wearing face of the ring, they intersect the side of the ring a slight distance toward the center of the ring from the wearing face thereof. By this construction, I increase the cross sectional area, and thereby the strength to resist breakage, of the outer tongue of the joint. It is understood that, until the ring wears sufficiently for the oblique sealing surfaces of the joint to meet the wearing face of the ring, there will be slight leakage through the clearance space provided between the ends of the ring adjacent the wearing face. The shortest distance from the wearing surface of the ring to the oblique surface is so calculated, however, that before appreciable leakage may develop between the ends of the ring, the oblique surface will meet the wearing surface so that leakage will then be effectively prevented during further wear. In other words, according to my invention, I provide a piston ring having an oblique sealing joint in which the outer tongue of the joint is strong to resist breakage, and in which, when new, leakage is controlled by the slight clearance space between the ends of the ring, and further in which, after slight wear, leakage past the ring is effectively prevented by the joint.

In rings of the type above described, it has heretofore been proposed to provide a fillet between the diagonal sealing surface of the tongues and the main body portion of the ring at the inner end of said sealing surface, and such fillet has been formed with a single large radius. While a fillet formed with such a radius provides the desired strengthening of the tongues to resist breakage, such strengthening is obtained at the expense of the life of the ring, since the large radius reduces the area of the diagonal surfaces of the ring joint in bearing contact, and consequently, after some wear takes place, said diagonal surfaces move out of bearing contact and thereby render the ring unfit for further use, although the thickness of the ring has not been reduced, due to wear, to such an extent that the ring need be discarded.

Another object of my invention is to provide a ring joint of the above character having an improved fillet, between the diagonal sealing surface of the tongues and the main body portion of the ring at the inner end of said sealing surface, which is adapted to provide the strength to resist breakage of the tongues equal to that obtained with the large radius fillet heretofore employed, but which is so formed as to provide for a longer life of the ring than heretofore obtained with rings having the ordinary large radius fillet.

In fitting piston rings to a cylinder, a certain clearance space is provided between the ends of the ring, so that in rings having a diagonal sealing joint and a strengthening fillet, such as above described, it is useless, and involves unnecessary refinement and expense to form the end of the tongues to fit the fillets, although it is desirable that the tongues should not engage the fillets when the ring joint is fully closed.

Another object of my invention is to provide a lap joint piston ring of the character in which a strengthening fillet is provided between the diagonal sealing surface of the tongues and the main body portion of the ring, and in which the diagonal edge at the end of the tongues is beveled, so that said ends will not engage said fillets when the ring joint is fully closed.

Other objects and advantages of my invention will be apparent from the following more detailed description of the invention.

In the accompanying drawing; Fig. 1 is an elevation of a part of a packing ring set on edge and showing a ring joint which is open and embodying my invention; Fig. 2 is a side view of the portion of the ring shown in Fig. 1 but with the joint closed; Fig. 3 is a plan view of the portion of ring shown in Fig. 2 looking at the wearing face; Fig. 4 is a cross sectional view of the ring joint shown in Figs. 1, 2 and 3, as it would appear applied to a piston mounted in a cylinder; Fig. 5 is an enlarged view of a portion of a ring showing a cross section of my improved ring joint; and Fig. 6 is an enlarged view of a portion of the ring joint looking at the edge of the ring and with the complementary portions of the joint shown in working relation.

As shown in the drawing, the ring is of the type having a wearing face 1 adapted to engage the wall of a cylinder, side faces 2 and 3 adapted to slidably engage the side walls of a groove in a piston and an inner circumferential face 4. The joint between the two ends of the ring is formed by the sliding engagement of an inner tongue 5 on one end of the ring and an outer and complementary tongue 6 on the other end of the ring.

The tongue 6 is formed by cutting away the metal of the end of the ring to a diagonal plane 7 while the tongue 5 is formed by cutting away the metal of the other end of the ring to said diagonal plane, these two cuts being so arranged that when the ring is compressed to fit a cylinder, the tongues 5 and 6 fit over each other, with the diagonal surface 8 of one tongue engaging the diagonal surface 9 of the other tongue to form a leak-proof seal.

The cooperating diagonal surfaces 8 and 9 preferably constitute a section of the surface of a cylinder, the radius of which is equal to the length of a line drawn between a point on and normal to the overlapping surfaces 8 and 9, midway between the edges thereof, to a point where the line intersects the longitudinal axis of the working circumference of the ring. By this construction it has been found that a leak-proof joint is formed between the diagonal surfaces 8 and 9 which will remain leak-proof upon wear of the ring and consequent separation of the ends of the ring so long as said diagonal surfaces remain in contact. This construction is fully described in the aforementioned patent, in view of which, it is not deemed necessary to provide a more detailed description in the present application.

According to the invention the diagonal plane 7 representing the plane of engagement between the surfaces 8 and 9 intersects the side 3 of the ring at a line spaced from the inner circumferential face 4 of the ring a distance such as A, while said plane intersects the side 2 of the ring at a line spaced from the wearing face 1 of the ring a distance such as B. By this construction I obtain a relatively large cross section of material in the outer tongue 6 of the ring, as indicated by the section of metal at the left hand side of the diagonal plane 7 in Figs. 4 and 5, and as compared to the section of metal obtained in the corresponding tongue in a construction such as disclosed in the aforementioned patent. In Fig. 5 I have shown by a dash line 12 the disposition of the diagonal sealing surfaces of a joint constructed in accordance with the aforementioned patent in order to show clearly the gain in metal and therefore strength of the outer tongue 6 when the joint is constructed in accordance with my invention, such gain being represented by the area of metal lying between the line 12 and plane 7.

When a new ring is installed in a piston there is a slight clearance provided between the ends of the ring at the joint to allow for expansion of the ring, such clearance being indicated by the reference numeral 13 in Figs. 2 and 3, and it will be evident that until the outer circumferential face 1 of the ring wears down to the surface 14 indicated in Fig. 5, there will be a direct, though very small, leakage path through the ring. When the ring becomes worn to surface 14 however, the edge 15 of tongue 5 will engage the wall of the cylinder and thereby close said leakage path, so that thereafter the ring will function to provide a leak-proof seal in the same manner as that disclosed in the aforementioned patent, and it should be noted that the distance B is so arranged that edge 15 of the inner tongue will obtain bearing against the wall of a cylinder before the leakage path by way of clearance 13 has become sufficiently large to permit appreciable leakage.

It will be noted that by the above construction, a stronger outer tongue is obtained than with the construction disclosed in the pending application, and while in this construction a direct leakage path is obtained until the ring wears down slightly, the joint is so designed that edge 15 of the inner tongue 5 of the joint will obtain bearing on the cylinder wall before such leakage becomes appreciable, and it will be further noted, that after such wear has occurred as to bring edge 15 of tongue 6 into engagement with the cylinder wall the cross sectional area and therefore the strength of the outer tongue 6 is still substantially the same as said tongue in a new ring constructed in accordance with the aforementioned patent.

In forming the tongues 5 and 6 of the ring joint as hereinbefore described, strengthening fillets 10 and 11 are formed between the diagonal sealing surfaces 8 and 9 and the adjacent surfaces 16 and 17, respectively, of the ring. In addition, the diagonal edge on the end of the tongues 5 and 6 is cut away to provide beveled surfaces 18 and 19, respectively, so that when the ring joint is fully closed, the ends of the tongues 5 and 6 will not engage fillets 11 and 10, respectively.

Fig. 6 discloses, on an enlarged scale, the particular construction of the portion of ring joint including fillet 10 and bevel 19 which is identical with that portion including fillet 11 and bevel 18, so that the following description of one portion will apply equally to the other portion.

According to the invention, the contour of fillet 10 is formed with two radii C and D, the radius C being long, as in prior constructions, to provide the desired strengthening of tongue 6 to resist breakage, while the radius D is relatively short and provides a smooth unbroken contour for the fillet 10 between the long radius C and the surface 16 of the ring, it being noted that the contour formed by these two radii approximates that of a quarter of an ellipse.

The center from which the radius C is struck is so selected that the contour of fillet 10 is substantially tangent with the diagonal surface 8 at the line E, the distance between line E and surface 16 of the ring being less than the length of radius C. If the contour of the fillet 10 were formed with one long radius, such as radius C, as used in prior constructions, the contour of fillet 10 would be in the form of a quarter circle as indicated by the dash line 12, and therefore tangent to the diagonal surface 8 at the line F.

The bevel 19 on tongue 6 intersects the diagonal surface 9 of said tongue at a line 20 which is disposed back of the radial end face of the tongue a distance at least equal to that between surface 16 and tangent line E, and said bevel is formed at such an angle that the tongue 6 will not engage fillet 10 when the ring joint is fully closed. With prior constructions of fillet 10, such as indicated by the dash contour line 12, the diagonal edge of tongue 6 had to be cut back on the diagonal surface 9 a distance beyond the line 20 equal to the distance G, in order to prevent engagement of the end of the tongue with the fillet when the joint was fully closed. It will therefore be noted that, according to my construction, I have increased the length of the effective bearing area of each of the diagonal surfaces 8 and 9 by the distance G, which increases the expansive life of the ring, due to peripheral wear, by a distance equal to 2G, and this increase in the life of the ring has been obtained without any sacrifice in the strengthening effect of fillet 10 to prevent breakage of tongue 5.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A packing ring joint consisting of two complementary tongues having overlapping and slidably engaging sealing surfaces, a fillet at the junction of each of said surfaces with the main body portion of the ring, and a beveled surface on the end of each tongue designed to clear the fillet when the ring is fully closed.

2. A packing ring joint consisting of two complementary tongues having diagonally disposed, overlapping and slidably engaging sealing surfaces, a fillet at the junction of each of said surfaces with the main body portion of the ring, and a beveled surface on the end of each tongue designed to clear the fillet when the ring is fully closed.

3. A packing ring joint consisting of two complementary tongues having diagonally disposed, overlapping and slidably engaging sealing surfaces, a fillet at the junction of each of said surfaces with the main body portion of the ring, and a beveled surface on the end of each tongue designed to clear the fillet when the ring is fully closed, the contour of each of said fillets being formed with a large radius terminating at one end substantially tangent to the sealing surface, and a smaller radius joined substantially tangentially to the large radius and to the main body portion of the ring adjacent the inner end of said sealing surface.

4. A packing ring joint consisting of two complementary tongues having diagonally disposed, overlapping and slidably engaging sealing surfaces, a fillet at the junction of each of said surfaces with the main body portion of the ring, and a beveled surface on the end of each tongue designed to clear the fillet when the ring is fully closed, the contour of each of said fillets being substantially in the form of a quarter of an ellipse with the major radius substantially tangent to the diagonal sealing surface and the minor radius substantially tangent to the main body portion of the ring adjacent the inner end of the sealing surface.

5. A packing ring joint consisting of two complementary tongues having diagonally disposed, overlapping and slidably engaging sealing surfaces, a fillet at the junction of each of said surfaces with the main body portion of the ring, and a beveled surface on the end of each tongue designed to clear the fillet when the ring is fully closed, the contour of each of said fillets being formed with a large radius terminating at one end at substantially the line of tangency with the diagonal sealing surface and swung from a pivot point spaced, a less distance than the length of said radius, from the surface on the main body portion of the ring adjacent the inner end of said sealing surface, and a smaller radius connecting the large radius to said surface on the main body portion of the ring adjacent the inner end of said sealing surface.

6. A packing ring joint consisting of two complementary tongues having diagonally disposed, overlapping and slidably engaging sealing surfaces, a fillet at the junction of each of said surfaces with the main body portion of the ring, and a beveled surface on the end of each tongue designed to clear the fillet when the ring is fully closed, each of said fillets having a portion merging with the diagonal sealing surface the contour of which has a relatively long radius of curvature, and a portion merging with the radial surface of the joint the contour of which has a relatively short radius of curvature.

7. A piston packing comprising an expansible ring having complementary tongues with overlapping and slidably engaging sealing surfaces cut diagonally through the ring from one side face to the opposite side face, the line at which the sealing surfaces meet one side face of the ring being spaced at such distance from the cylinder engaging face, relative to the length of the tongues, that when the ring is worn to the extent of the space originally existing between the line and cylinder engaging face, the tongues will still be in overlapping relationship and leakage between the ends of the ring will be prevented.

8. A piston packing comprising an expansible ring having an inner tongue and a complementary outer tongue, said tongues having overlapping and slidably engaging sealing surfaces of such length relative to the thickness of the portion of the ring to be worn away in use as to still be in overlapping relationship after such amount of wear has occurred, said sealing surfaces being disposed in a plane extending diagonally through the ring from one side face to the opposite side face, and meeting one side face of the ring at a line spaced from the cylinder engaging face a distance less than said thickness, so that after the ring is worn to the extent of the space originally existing between said line and cylinder engaging face, said inner tongue will form a part of the cylinder engaging face of the ring to prevent leakage between the ends of the ring during the further wear of the ring.

CLYDE C. FARMER.